Patented June 30, 1931

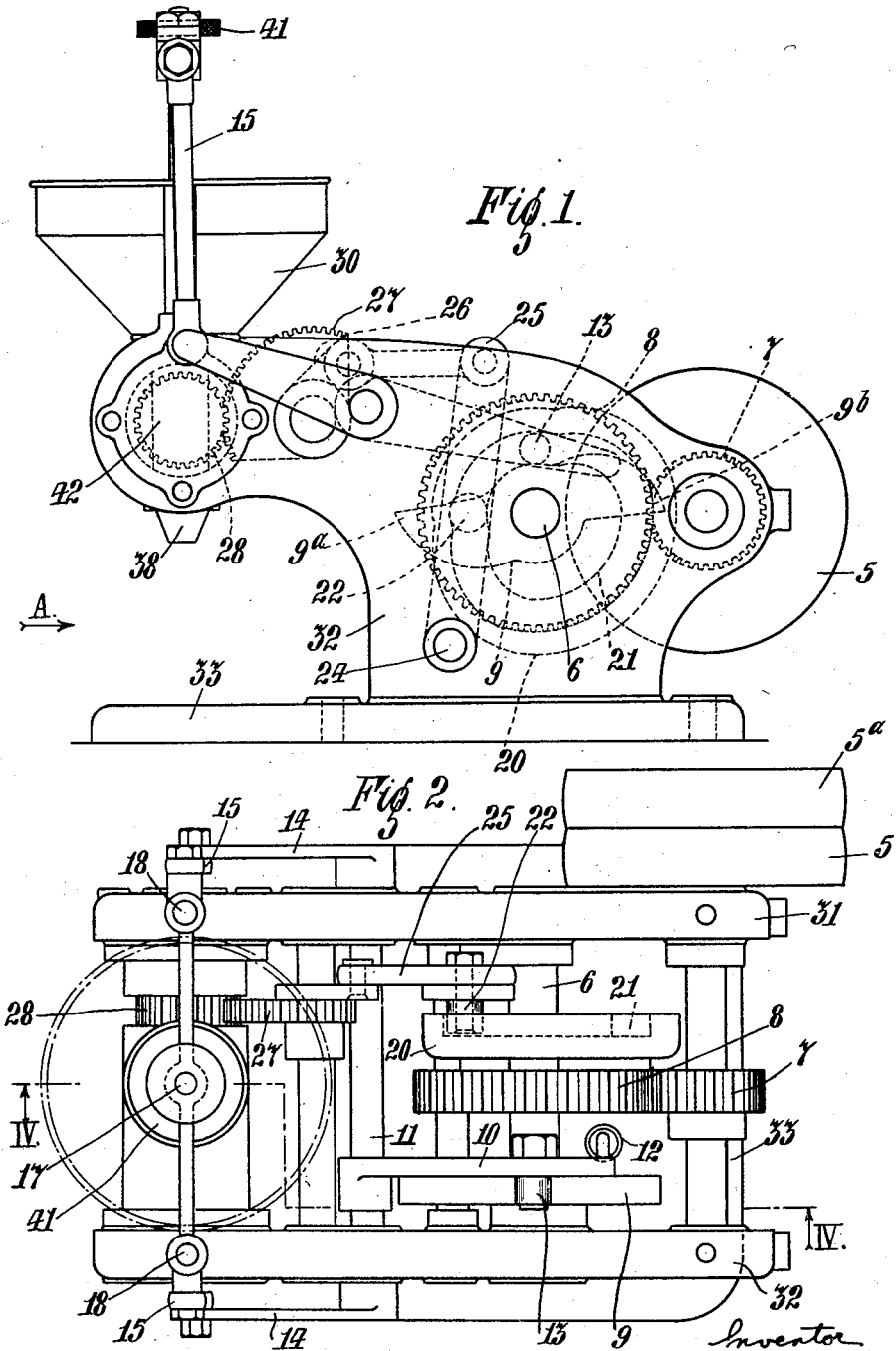

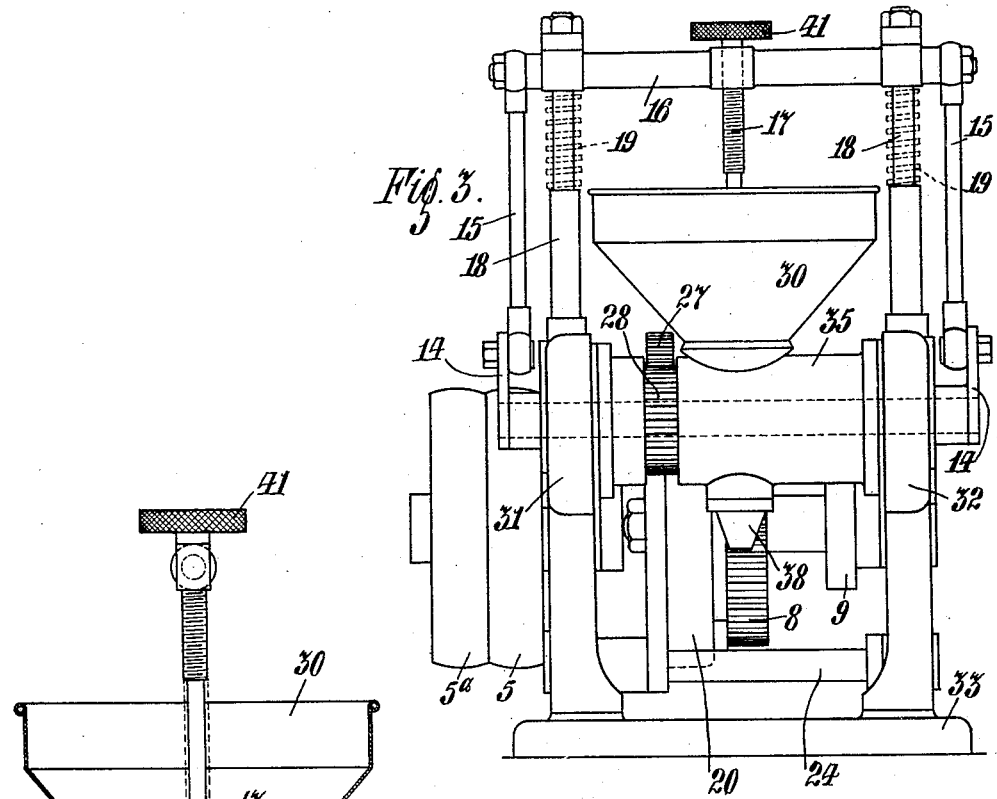
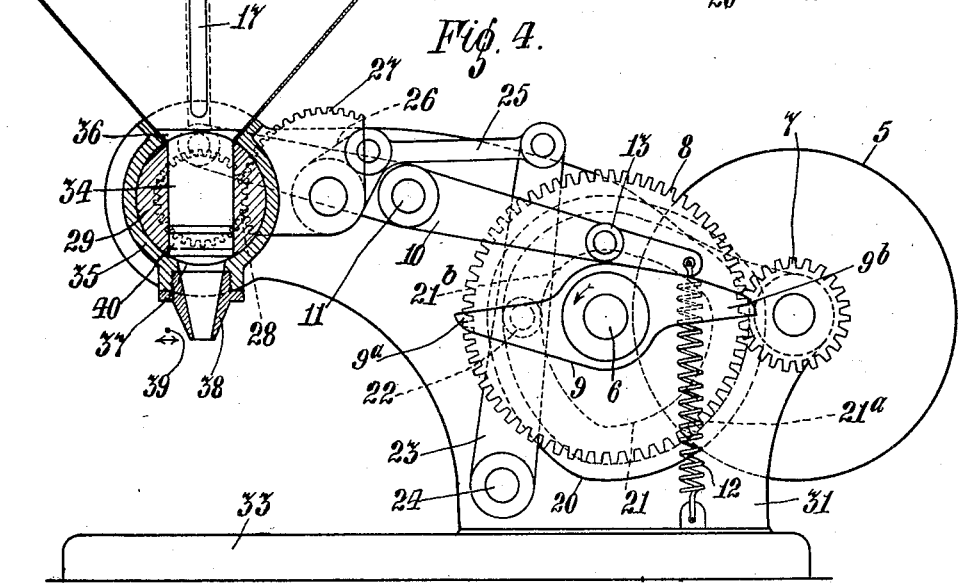

1,811,957

UNITED STATES PATENT OFFICE

JAMES MORTON, OF WISHAW, SCOTLAND; WILLIAM MORTON, EXECUTOR OF SAID JAMES MORTON, DECEASED, ASSIGNOR TO ROBERT HENRY MORTON, OF WISHAW, SCOTLAND, AND HIMSELF

DEVICE FOR MEASURING AND DEPOSITING MEASURED QUANTITIES OF LIQUID, PLASTIC, GRANULAR, AND OTHER SIMILAR SUBSTANCES

Application filed January 8, 1930, Serial No. 419,340, and in Great Britain February 16, 1929.

This invention relates to devices of the type used for measuring and depositing measured quantities of liquids, whether fluid or viscous, plastic substances such as cake mixtures or fillings and jam, granular substances such as flour or other substances which are capable of being poured.

In known devices of this type, for use, for instance, for depositing confection on the upper side of cakes, the arrangement consists essentially of a cylindrical receptacle for the substance, which receptacle is revoluble about a transverse axis and has a reciprocating piston adapted alternately to draw the substance into or eject it from the receptacle at every half revolution thereof, so taking measured quantities of the substance from a hopper or the like above and depositing them on articles below.

The object of the present invention is to remove inherent defects in devices of the above kind, and particularly to overcome the difficulties attached to the reciprocation of the piston which, in addition to reciprocation, is rotated about an axis parallel with a diameter thereof.

A further object of the invention is to provide a device of the aforesaid type which is automatic and efficient in operation; further objects will appear throughout the specification.

I will now describe my invention, by way of example, with reference to the accompanying drawings; whereon—

Fig. 1 shows in front elevation, an automatic machine for delivering measured quantities of jam or the like to pastry;

Fig. 2 is a plan view corresponding to Fig. 1;

Fig. 3 is an end elevation in the direction of the arrow A, Fig. 1;

Fig. 4 is a sectional elevation on the line IV—IV, Fig. 2.

The machine is adapted to be driven by a belt driving either a fast pulley 5 or a loose pulley $5^a$, this pulley 5 driving the main shaft 6 through gears 7, 8. This shaft 6 is journalled in two upright frame members, 31, 32 supported on the bed plate 33 of the machine, and rotates a cam 9 having two humps $9^a$, $9^b$, which serve to oscillate a lever 10, pivoted on a shaft 11; the lever 10 has a follower bearing on the cam 9 by means of a roller 13, and the free end of the lever is urged downwardly by a spring 12. The shaft 11 carries a pair of cranks 14 linked by connecting rods 15 to a cross bar 16 in which the plunger 17 is screwed so as to be adjustable in height; the cross bar 16 and plunger are adapted to be reciprocated bodily on the vertical guides 18 by the action of the connecting rods 15, downward motion of the cross bar and plunger being resisted by the springs 19. In the drawings the plunger is shown at its uppermost position.

The main shaft 6 also rotates a slotted cam 20 having a slot 21 in which rides the roller of a follower 22; the motion of this cam serves to oscillate the lever 23 about the pivot 24, in a vertical plane. The upper end of the lever 23 is linked by a rod 25 with the crank 26 which is rigidly connected with a toothed sector 27 engaging teeth 28 on the periphery of the drum 29 hereinafter to be described.

The jam to be measured and deposited is carried in the hopper 30 and feeds therefrom through an opening in the bottom thereof into an open ended cylinder 34 which diametrally traverses the cylindrical drum 29; this drum 29 is adapted to oscillate in a sleeve 35 which acts as a bearing therefor and which is provided with two ports 36, 37 corresponding in size and shape with the open ends of the cylinder 34, these ports enabling the jam to be drawn into, or delivered from, the cylinder. A nozzle 38 is provided at the lower port, 37, to deliver the jam clearly and neatly to the pastry therebelow; to keep this nozzle clean a wire 39 is passed across the orifice of the nozzle after every delivery of the jam therefrom. The cylinder 34 is provided with a free or floating piston 40 (that is, a piston free from direct connection with any external parts); this piston is adapted to be forced downwardly through the cylinder by each downward stroke of the plunger 17. By turning the plunger by the knob 41 on the upper end thereof the length of stroke of the piston can be adjusted.

A removable cover plate 42 is provided at the end of the drum, enabling it to be removed for cleaning or other purposes.

In operation, the jam is placed in the hopper 30 and the drive is communicated to the main shaft 6 by the belt pulley 5, rotation of this shaft causing the sector 27 to be oscillated through a predetermined angle and the gearing between this sector and the teeth 28 on the drum is arranged so that for each to and fro movement (or oscillation) of the sector the drum is turned alternately clockwise and anti-clockwise (Fig. 4) through 180°, thereby causing each of the open ends of the cylinder 34 alternately to register with the outlet from the hopper 30 and with the nozzle 38. The time during which these ports are maintained in such register is controlled by the shape of the cam 20; in the present machine a considerable pause in the motion of the drum is made while the ports are in register, by the cam groove or surface at the corresponding position being made of constantly or substantially constant radius, as at 21ª and 21ᵇ (Fig. 4).

The rotation of the shaft 6 also causes the plunger 17 to be reciprocated in step or synchronism with the oscillations of the drum; that is, the plunger moves downward and drives the piston 40 downward during each pause in the motion of the drum when the open ends of the cylinder are in register with the ports 36 and 37. When the piston 40 is moved downward and expels the jam from the cylinder 34 and delivers it through the nozzle 38 so that it is deposited on the pastry below, simultaneously the downward movement of the piston causes the jam from the hopper to be sucked or drawn into the cylinder until the piston reaches the lower end of its travel, whereupon the drum 39 is turned through 180° so that the piston now assumes a position at the top of the cylinder; the plunger now acts on the piston as before in order to deliver the jam measured in the cylinder, at the same time causing the cylinder to be filled with another batch of jam, and so the cycle of operations is continued. The springs 19 and 12 and the shape of the cam 9 serve to give the plunger 17 a quick return motion between downward strokes thereof.

The amount of jam or other substance to be measured or deposited or delivered can be adjusted by varying the stroke of the plunger, and therefore the piston, in the manner described above. Substantially the same amount of jam or other substance is drawn into the cylinder at each stroke of the piston.

Obviously, the drum 29 could be turned intermittently through 180° in the same direction instead of being oscillated, but I find the latter method better in practice.

The machine described is particularly suitable for use in conjunction with a conveyor adapted intermittently to feed a series of pastry shells or containers underneath and past the delivery nozzle. Such conveyor would be operated in synchronism with the machine.

When granular substances or liquids are being dealt with in the type of machine just described it may be desirable to provide an automatically opened and closed valve or cock for the depositing nozzle, particularly if the full stroke of the piston is not being used for delivery.

By adjustment in the shape of the cams 9 and 21, I can vary the time in each cycle of operations at which the piston is actuated or the drum is turned.

Moreover, the apparatus may be applied to a barrel or other container for the jam or other substance, while the number of cylinders and plungers can be increased so that more than one measured quantity of the substance is deposited at each operation.

The cylinder and piston described above can of course be replaced by corresponding members of non-circular section.

I claim:—

1. A device of the type aforesaid, comprising in combination, a stationary cylindrical sleeve member having two diametrally opposite ports therein, a drum turnable in said sleeve member, an open ended diametral cylindrical receptacle in said drum, a free piston in said receptacle, means for intermittently oscillating said drum through substantially 180°, in order to bring each open end of said receptacle into register with a corresponding port in said sleeve member, a reciprocative plunger separate from said piston and adapted, when the ends of the receptacle register with said ports in the sleeve member, to actuate said piston through one of said ports, and means for supplying the substance to be deposited and measured to the port when the piston is actuated, said plunger reciprocating in synchronism with the oscillation of said drum.

2. A device of the type aforesaid, comprising a combination, a stationary cylindrical sleeve member having two diametrically opposite ports therein, a drum trunable in said sleeve member, an open ended diametral cylindrical receptacle in said drum, a free piston in said receptacle, means for intermittently oscillating said drum through substantially 180°, in order to bring each open end of said receptacle into register with a corresponding port in said sleeve member, a reciprocative plunger separate from said piston and adapted, when the ends of the receptacle register with said ports in the sleeve member, to actuate said piston through one of said ports, and a hopper for supplying the substance to be deposited and measured to the port when the piston is actuated, said plunger reciprocating in synchronism with the oscillation of said drum.

3. A device of the type aforesaid, comprising in combination, a stationary cylindrical sleeve member having two diametrally opposite ports therein, a drum turnable in said sleeve member, an open ended diametral cylindrical receptacle in said drum, a free piston in said receptacle, means comprising cam actuated lever mechanism which oscillates a toothed sector engaging teeth on said drum for intermittently oscillating said drum through substantially 180°, in order to bring each open end of said receptacle into register with a corresponding port in said sleeve member, a reciprocative plunger separate from said piston and adapted, when the ends of the receptacle register with said ports in the sleeve member, to actuate said piston through one of said ports, and means for supplying the substance to be deposited and measured to the port when the piston is actuated, said plunger reciprocating in synchronism with the oscillation of said drum.

4. A device of the type aforesaid, comprising in combination, a stationary cylindrical sleeve member having two diametrally opposite ports therein, a drum turnable in said sleeve member, an open ended diametral cylindrical receptacle in said drum, a free piston in said receptacle, means for intermittently oscillating said drum through substantially 180°, in order to bring each open end of said receptacle into register with a corresponding port in said sleeve member, a reciprocative plunger separate from said piston and operated by at least one connecting rod actuated by cam and following lever mechanism and adapted, when the ends of the receptacle register with said ports in the sleeve member, to actuate said piston through one of said ports, and means for supplying the substance to be deposited and measured to the port when the piston is actuated, said plunger reciprocating in synchronism with the oscillation of said drum.

5. A device of the type aforesaid, comprising in combination, a stationary cylindrical sleeve member having two diametrally opposite ports therein, a drum turnable in said sleeve member, an open ended diametral cylindrical receptacle in said drum, a free piston in said receptacle, means comprising cam actuated lever mechanism which oscillates a toothed sector engaging teeth on said drum for intermittently oscillating said drum through substantially 180°, in order to bring each open end of said receptacle into register with a corresponding port in said sleeve member, a reciprocative plunger separate from said piston and operated by at least one connecting rod actuated by cam and following lever mechanism and adapted, when the ends of the receptacle register with said ports in the sleeve member, to actuate said piston through one of said ports, and means for supplying the substance to be deposited and measured to the port when the piston is actuated said plunger reciprocating in synchronism with the oscillation of said drum.

In testimony whereof I affix my signature.

JAMES MORTON.